United States Patent [19]
Barnett

[11] Patent Number: 5,551,193
[45] Date of Patent: Sep. 3, 1996

[54] WINDOW ASSEMBLY BLADE SEAL

[75] Inventor: Wayne Barnett, Lawrenceburg, Tenn.

[73] Assignee: Excel Industries, Inc., Elkhart, Ind.

[21] Appl. No.: 358,199

[22] Filed: Dec. 16, 1994

[51] Int. Cl.$^6$ ..................................................... E06B 7/232
[52] U.S. Cl. ............................ 49/496.1; 49/380; 49/489.1
[58] Field of Search ................................. 49/496.1, 380, 49/360, 489.1, 413

[56] References Cited

U.S. PATENT DOCUMENTS

| | | | |
|---|---|---|---|
| 1,763,603 | 6/1930 | Donahue | 49/489.1 X |
| 2,781,835 | 2/1957 | Westman | 49/489.1 X |
| 4,157,634 | 6/1979 | Coulston | 49/496.1 X |
| 4,419,844 | 12/1983 | Kreisfeld | 49/496.1 X |
| 4,785,583 | 11/1988 | Kawagoe et al. | 49/413 X |
| 5,005,317 | 4/1991 | Saint-Louis Augustin et al. | 49/496.1 X |
| 5,345,717 | 9/1994 | Mori et al. | 49/380 X |

Primary Examiner—Philip C. Kannan
Attorney, Agent, or Firm—Banner & Allegretti, Ltd.

[57] ABSTRACT

A flexible blade seal for a window assembly has an elongate body of substantially uniform cross-section formed of flexible elastomeric material. As viewed in cross-section, the blade seal has a seal segment forming an exposed, substantially planar sealing surface for contact with a surface of a windowpane, e.g., a sliding pane of the window assembly. In its free state the sealing surface is presented at an angle to the surface of the sliding pane, extending from a free end to a substantially flat end wall. A lateral segment of the blade seal extends from the end wall at an acute angle to the seal segment to an angled junction with a base segment. The base segment extends to a free distal portion adapted for attachment to the window assembly for mounting the blade seal. The flat end wall of the blade seal is generally perpendicular to the plane of the window opening and provides an abutting surface for surface-to-surface contact with another blade seal or other sealing member.

13 Claims, 3 Drawing Sheets

WINDOW ASSEMBLY BLADE SEAL

INTRODUCTION

The present invention is directed to flexible blade seals for window assemblies and, more particularly, to flexible blade seals suitable for sealing a gap between a sliding pane and an adjacent member of the window assembly.

BACKGROUND

It has long been known to use flexible blade seals of various designs, such as that shown in FIG. 1 of the appended drawings, to provide a seal between a fixed or sliding pane of a window assembly and a frame member or other adjacent surface of the assembly. Such blade seals typically have a simple cross-sectional configuration, since they are produced preferably by extrusion or other molding technique adapted to mass production of extended lengths of the blade seal. As can be seen in FIG. 1 of the appended drawings, such known blade seals typically have a sealing surface 5 provided by a sealing segment 6, which extends at an angle to the top wall 7 of a base segment 8. The base segment 8 is adapted to be attachable to a window frame or the like.

The blade seal in a window assembly must perform several critical functions. Not only must it seal out weather, that is, precipitation and wind; it must also provide an effective reduction in wind noise. Further, the blade seal must perform these functions typically over an extended time period and often under harsh environmental conditions. In window assemblies intended for automotive vehicle body applications, for example, as the rear window assembly in a pickup truck or the like, the blade seal will be exposed to both hot and cold temperature extremes, often cycling quickly from one to the other.

Difficulty in providing an effective and enduring weather and noise seal is experienced not only along the main length of a blade seal. Particular sealing problems have been experienced at the extreme ends of a blade seal, where, typically, it interfaces with other sealing members. Thus, in a typical automotive window assembly application, a first blade seal may be used along a vertical edge of the window opening fitted with a sliding pane, and additional blade seals may be used along the upper and lower horizontal edges of the window opening. Yet another blade seal may be used at the opposite vertical edge. At the four corners of the window opening, the individual blade seals must cooperate to form an effective weather and noise seal.

There is a need for more effective blade seals, providing better and more durable performance, especially in window assemblies equipped with sliding panes. There is also a need for more effective noise and weather sealing at the corners of a window opening, where one blade seal cooperates with another blade seal or other sealing member to form a continuous seal about the periphery of the window opening. It is an object of the present invention to provide improved blade seal performance to meet some or all of these existing needs. These and other objectives of the invention will become apparent from the following disclosure and description of various embodiments of the invention.

SUMMARY

In accordance with a first aspect, a flexible blade seal for a window assembly is provided, having an elongate body of substantially uniform cross-sectional configuration. The elongate body is formed of flexible elastomeric material, and preferably is unitary in the sense that it is seamless from one end to the other and in its cross-sectional configuration (except such seams as may be formed by co-extrusion or other molding techniques or the like). It will be understood by those who are skilled in this area of technology, however, that it may have attachment means embedded in or passing through the elastomeric material. Also, separate lengths of the blade seal may be used along a single edge of a window opening, for example, to permit an interruption for a locking latch or the like. In cross-sectional configuration, the elongate body has a seal segment which forms an exposed, substantially planar sealing surface for contacting a surface of the windowpane. The blade seal is flexible in the sense that such sealing surface is resiliently biased into sealing contact with the surface of the pane. The sealing surface extends from a free end to a substantially flat end wall. A lateral segment of the unitary body extends back from the end wall, at an acute angle to the seal segment, to an angled junction with a base segment. The base segment extends from such angled junction with the lateral segment in a direction substantially away from the seal segment to a free distal portion which is adapted for attachment to the window assembly.

The lateral segment preferably extends between the end wall and the angled junction with the base segment in a plane substantially parallel to the sealing plane, that is, the plane of interfacial contact between the sealing surface and the windowpane. In its free state, that is, when not in contact with the surface of the pane, the sealing surface of the seal segment preferably extends at a diagonal angle to the sealing plane, such that it intersects the sealing plane and is deflected upon contact with the pane, e.g., when a slidably mounted paned is moved to its closed position. It should be understood that the novel blade seals disclosed herein are suitable for use in sealing about the periphery of a sliding pane or fixed windowpane. The free distal portion of the elastomeric body, as described further below in connection with certain preferred embodiments, may be adhesively bonded to a surface of an adjacent windowpane, received in a recess formed in a frame member, or mounted in the window assembly by other suitable means.

Directional references used herein will, for convenience and consistency of description, assume a window assembly mounted as the rear window in the cab or passenger compartment of a motor vehicle, such as a pickup truck or the like. Thus, an interior surface of the window is a forward surface which faces into the passenger compartment. An exterior surface faces rearward of the vehicle. The lateral directions are right and left as one faces from the back to the front of the vehicle.

In accordance with another aspect, a window assembly is provided having a blade seal as disclosed above, most preferably for sealing against a sliding pane mounted in a window opening for movement between an open position and a closed position. A vertical blade seal as described above is provided for closing a gap between the sliding pane and an adjacent member of the window assembly. The exposed, substantially planar sealing surface of the blade seal is resiliently biased toward sliding contact with a surface, typically the outside surface, of the sliding pane in its closed position. In preferred embodiments, the end wall formed at the junction between the seal segment and the lateral segment is substantially perpendicular to the surface of the sliding pane against which the sealing surface will lie, and faces toward the window opening. A surface of another sealing means, most preferably a flat end surface of a second blade seal, advantageously forms a surface-to-surface abutting contact with such end wall, typically at the corners of the window opening.

Those who are skilled in the art will recognize from the foregoing disclosure and from the following discussion of certain preferred embodiments that the novel blade seals and window assemblies in which they are used represent a significant advance in this area of technology. Improved sealing performance can be obtained, including both noise and weather sealing. One particularly significant advantage can be obtained through use of the substantially flat end wall provided by the novel blade seals. As indicated above, the substantially flat end wall provides an abutment surface against which other blade seals or other sealing means can form a secure surface-to-surface contact, whereby effective noise and weather sealing can be achieved even at the corners of a window assembly where sealing has often been less effective than desired. Additional features and advantages will become apparent from the following detailed description of certain preferred embodiments.

BRIEF DESCRIPTION OF THE DRAWINGS

Certain preferred embodiments will be discussed below in detail with reference to the appended drawings wherein.

Figure 1:
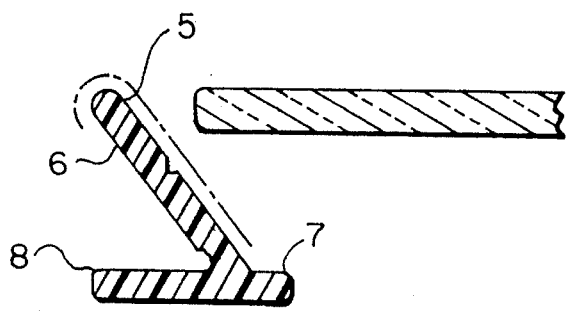
FIG. 1, referred to in the background discussion above, illustrates the cross-sectional configuration of a known blade seal.

The figures referred to above are not drawn necessarily to scale and should be understood to present a simplified representation of the invention, illustrative of the basic principles involved. Window assemblies incorporating the novel blade seals will have configurations and components determined, in part, by the intended application and use environment. Some features of the window assembly depicted in the accompanying figures have been enlarged or distorted relative to others to facilitate visualization and understanding. In particular, thin features may be thickened and long features may be shortened. References to direction and position, unless otherwise indicated, refer to the orientation of the window assembly illustrated in the drawings. Consistent with the description of directional references provided above, "forward" means toward the front of the vehicle; "rearward" means toward the rear of the vehicle, "right-side" means the passenger side of the vehicle (for vehicles intended for a left-drive vehicle market, such as the United States, and vice versa for vehicles intended for right-drive vehicle markets, such as the United Kingdom); "exterior" refers to a direction or position outwardly of the passenger compartment; and "inward" or "interior" refers to a direction toward or into the passenger compartment of the vehicle. It should be understood that window assemblies of the invention can be adapted for use in any orientation and for architectural and other applications in addition to motor vehicle applications.

DETAILED DESCRIPTION OF CERTAIN PREFERRED EMBODIMENTS

Figure 2:
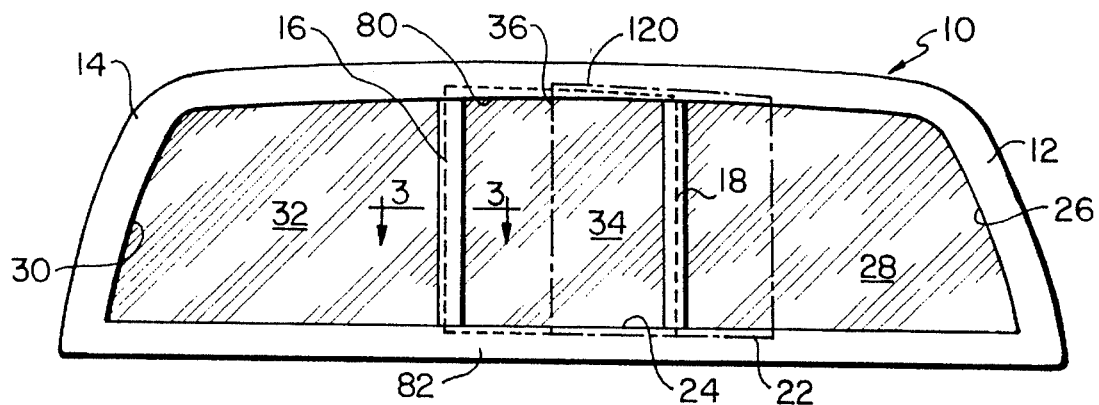
FIG. 2 is a schematic elevation view of a window assembly having a center mounted sliding pane between right- and left-hand fixed panes, in accordance with one preferred embodiment.

The new blade seals disclosed above and window assemblies employing one or more such blade seals will be recognized by those skilled in the art to be suitable for numerous different applications. As indicated above, the blade seals are particularly well suited for closing a gap or space between a sliding pane and a fixed window assembly member, for example, a frame segment or an adjacent fixed pane of a window assembly. Window assemblies of this sort employing such blade seals are particularly well suited for use in motor vehicle glazing applications, for example, as rear windows in the passenger compartment of a pickup truck. For convenience of illustration, the appended drawings illustrate a window assembly having design features suitable for use as a pickup truck rear window. Nevertheless, those skilled in this area of technology will recognize that the principles of the invention here disclosed and described are applicable to other applications, as mentioned above, including architectural applications, other automotive applications, etc. For ease of understanding, all directional, positional and orientation terms used herein in describing the blade seal refer to the cross-sectional configuration of the blade seal as shown in the drawings, especially FIGS. 3, 4, 6 and 7. Similarly, such terms used in describing the window assembly refer to the assembly as shown in FIG. 2.

Figure 3:
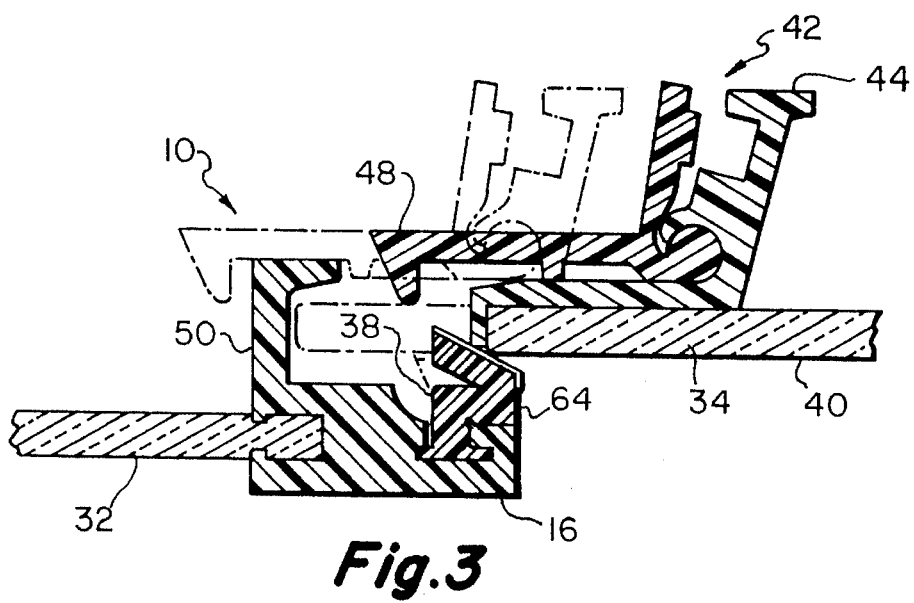
FIG. 3 is an enlarged cross-sectional view taken through line 3—3 of FIG. 2, showing a blade seal vertically mounted in a slot within a vertical post of the window assembly frame.

Referring now to FIGS. 2–5, a window assembly 10 is seen to comprise a frame 12 which includes a complete outer circumferential portion 14 and two intermediate vertical members 16 and 18. Members 16 and 18, together with upper horizontal section 20 and lower horizontal section 22, define a centrally located window opening 24. Frame 12 can be formed in accordance with manufacturing techniques well known to those skilled in the art, including injection molding of thermoplastic materials such as polyvinylchloride (PVC), reaction injection molding of polyurethane material, etc. In addition, fasteners, glass mounting fixtures and other components well known to those skilled in the art may be included in the frame in accordance with known techniques and designs. Right-hand window opening 26 is closed by fixed pane 28. Similarly, left-hand window opening 30 is closed by fixed pane 32. Center window opening 24 is closed by a sliding pane 34, which slides to the right from a closed position to an open position. Sliding pane 34 is seen in phantom in FIG. 2 in partially opened position, such that the leading edge 36 of sliding pane 34 is spaced to the right from vertical frame member 16. To close center pane 34, it is moved to the left until leading edge 36 overlies vertical frame member 16, as best seen in FIG. 3. It will be understood that the fixed and sliding panes of the window assembly may be formed of any suitable material, including glass, plastic, etc.

Figure 4:
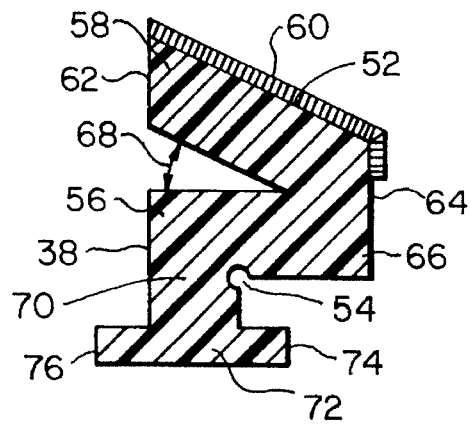
FIG. 4 is an enlarged view of the blade seal of FIG. 3 taken out of assembly.

Referring now specifically to FIG. 3, the window assembly 10 is seen to further comprise a flexible blade seal 38, shown in greater detail in FIG. 4, vertically mounted to frame member 16. Flexible blade seal 38 forms a weather and noise seal between vertical post 16 and sliding pane 34, when pane 34 is in its closed position, as seen in FIG. 3. More specifically, blade seal 38 fills the gap between post 36 and outside surface 40 of pane 34. Pane 34 is seen to be latched or locked in its closed position by latch mechanism 42 comprising fixed latch member 44 adhered to the inside surface 46 of sliding pane 34, and moveable latch member 48 which is biased into locking position (counterclockwise, as viewed in FIG. 3) over outer face 50 of vertical frame member 16.

Figure 5:
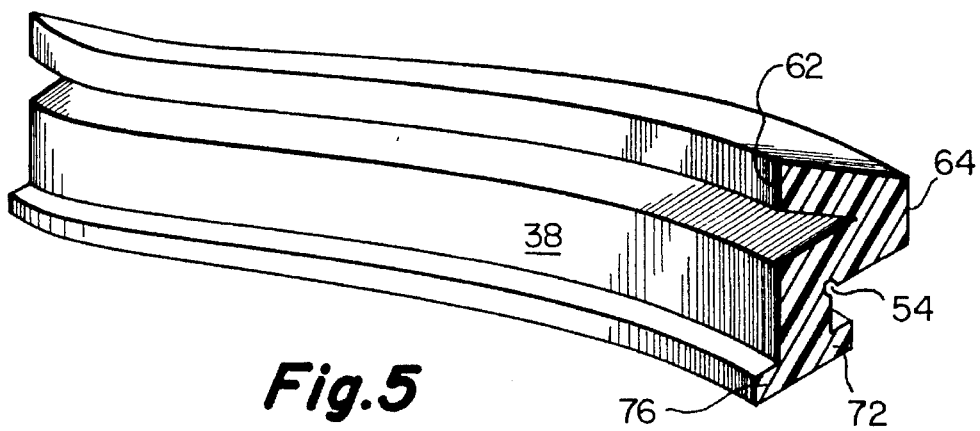
FIG. 5 is a perspective view of a blade seal, not in assembly, in accordance with the embodiment of FIGS. 2–4.

As best seen in FIGS. 4 and 5, the blade seal 38 comprises an elongate unitary body 56 of substantially uniform cross-sectional configuration. It is formed of flexible elastomeric material, such as natural or synthetic rubber, and most preferably EPDM. Due to its uniform cross-sectional configuration, the unitary body 56 can be extruded or co-extruded in accordance with known techniques, to achieve advantageous cost efficiency in its manufacture. The material need not be stretchable to any particular degree, beyond that called for by the specifications of the particular application in which the blade seal will be used. It is important, however, that it be sufficiently resilient and flexible that the blade seal achieve surface-to-surface sealing contact with the outside surface 40 of sliding pane 34. In certain prior known designs, such as that illustrated in FIG. 1, a notch was placed in the sealing surface of the blade to ensure adequate flexure. Notching the sealing surface of the blade in this fashion, however, led in some instances to premature fracture or other failure of the blade seal and diminished its noise and weather sealing efficacy. In accordance with the preferred embodiment illustrated in, FIGS. 2–5, sealing surface 52 is not notched in this fashion. Rather, flexure stress relief means preferably is provided in the form of a radius void 54 as discussed further below, leading to both improved sealing efficacy and improved seal durability.

Referring again specifically to FIG. 4, unitary body 56 of blade seal 38 is seen to comprise a seal segment 58 providing aforesaid exposed, substantially planar sealing surface 52 for contact against outside surface 40 of sliding pane 34. Sealing surface 52 is referred to as being "exposed" in that it is free for contact with the sliding pane 34. In preferred embodiments exposed sealing surface 52 does not directly face any other surface or section of the blade seal. Sealing surface 52 is substantially planar in the sense that it is flat or curvoplanar. In preferred embodiments sealing surface 52 is flocked, that is, it is provided with a polyester or other flocking material 60 in accordance with techniques well known to those skilled in the art.

Blade seal 38 is Shown in FIG. 4 in its free state, that is, in the configuration it naturally adopts when not in compressive contact with sliding pane 34 or other surface. It should be recognized that sealing surface 52 typically will be compressed downwardly (as viewed in FIG. 4) when in contact with sliding pane 34. Due to the resilient nature of the unitary body 56, sealing surface 52 will thereby be resiliently biased into sealing contact with pane 34. Additionally, it can be seen that sealing surface 52 extends diagonally to act as a ramp or beveled contact surface for leading edge 36 when pane 34 is moved from an open to a closed position. Advantageously, this provides good sealing surface durability and longevity, along with reliability in the interaction of the sliding pane and the blade seal.

Seal segment 58 is seen to extend from a free end 62 to a substantially flat end wall 64. Notably, the sealing surface meets the end wall, a feature not found in prior designs such as that shown in FIG. 1. The sealing segment in this way directly bolsters the end wall as a surface against which another seal or frame member can sealingly abut. End wall 64 is substantially flat in the sense described above, that is, that it provides a good abutment for surface-to-surface sealing contact with another blade seal or other sealing member, such that excellent sealing can be achieved even in the corners of window opening 24. Notably, this advantageous result is achievable without the fabrication and assembly complexity and expense of a one-piece full circumference sealing member. In contrast, prior known blade seal designs, such as that of FIG. 1, provide no such abutment surface for sealing contact to an adjacent blade seal or the like.

Figure 8:
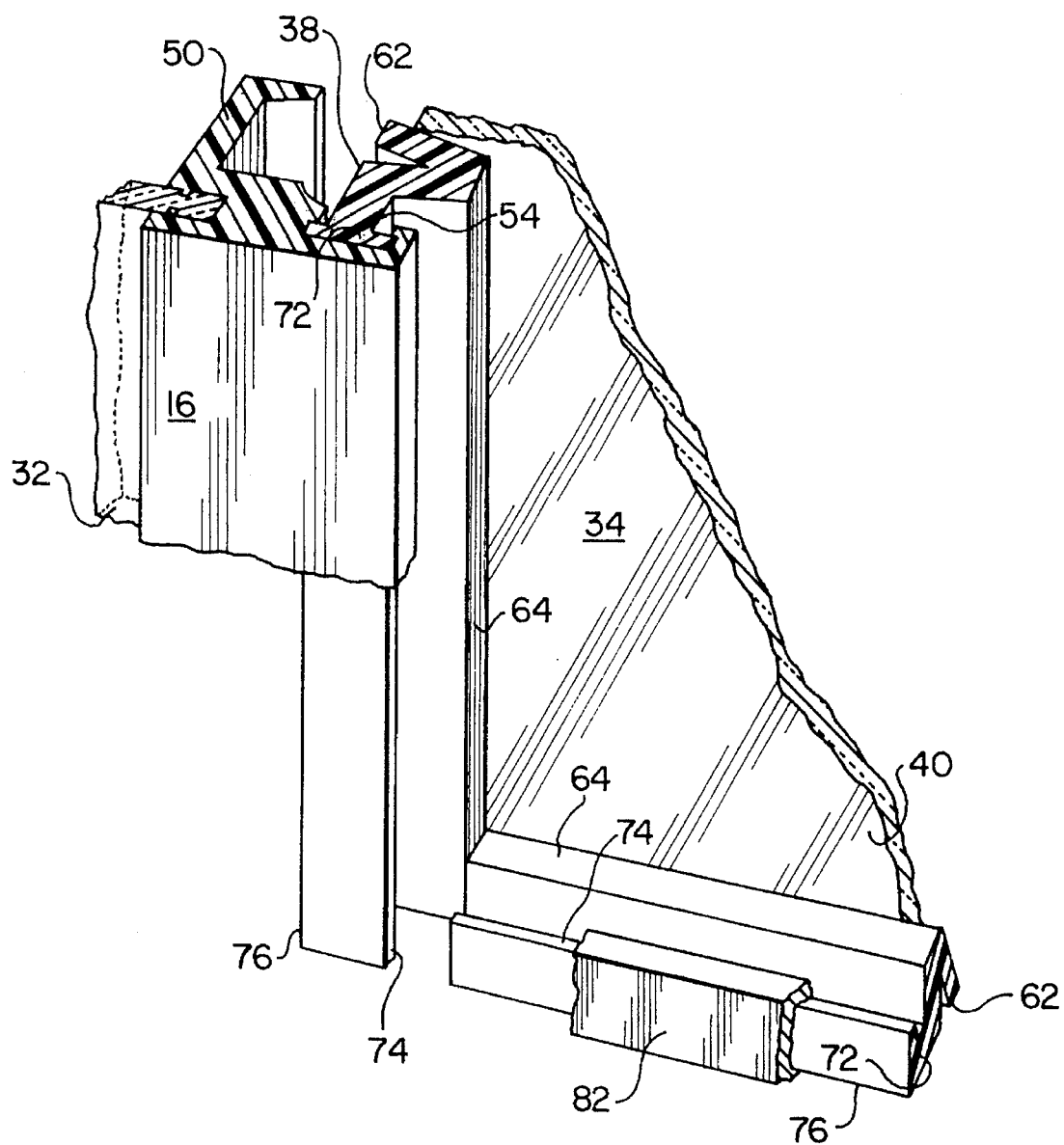
FIG. 8 is a partially cross-sectional perspective view of a horizontal blade seal in accordance with FIG. 5, mounted along a horizontal peripheral edge of a window opening in accordance with the embodiment of FIGS. 2 and 3, having a substantially flat end surface in surface-to-surface abutting contact with an end wall of the vertical blade seal, also in accordance with the embodiment of FIG. 5.

The end wall 64 is oriented in a plane perpendicular to the vertical plane of sliding pane 34, facing toward the opposite side of window opening 24. Thus, at the upper and lower ends of vertical frame section 16 end wall 64 provides an abutment surface for an upper and lower horizontal blade seal, respectively. That is, an upper horizontal blade seal mounted at the upper horizontal frame section 80, having a sealing surface in sliding contact with an upper horizontal peripheral area of the outside surface of the sliding pane, preferably would provide a substantially flat end surface. Such flat end surface of the upper horizontal blade seal would form surface-to-surface abutting contact with end wall 64 at the upper end of vertically oriented blade seal 38 at the upper left-hand corner of window opening 24 (as viewed in FIG. 2). Correspondingly, as shown in FIG. 8, the lower horizontal blade seal would provide a sealing surface in sliding contact with a lower horizontal peripheral area of the outside surface of sliding pane 34, and a substantially flat end surface for abutting contact with the end wall 64 of blade seal 38 at its lower end where lower horizontal frame section 82 forms the lower left-hand corner (as viewed in FIG. 2) of window opening 24 in cooperation with the lower end of vertical frame section 16.

Lateral segment 66 of the elongate unitary body extends at an acute angle 68 to seal segment 58. Acute angle 68 most preferably is from 25 to 65 degrees, although the actual angle will depend largely on the particular application for which the blade seal is intended. It can be seen in the preferred embodiment illustrated in FIG. 4 that lateral segment 66 extends from end wall 64 to its angled junction with the base segment 70 in a plane substantially parallel to the sealing plane, that is, substantially parallel to exterior surface 40 of sliding pane 34. While excellent sealing performance is found with the preferred cross-sectional configuration shown and described, those skilled in the art will understand, given the present disclosure, the interdependency of the material selected, including its flexibility, durometer, etc., the cross-sectional dimensions of the blade seal and the angles of intersection of its segments in accomplishing a desired degree of sealing bias, durability and overall seal performance characteristics.

Lateral segment 66 extends from end wall 64 to an angled, preferably right-angled, junction with base segment 70. Flexure stress relief is provided at this angled juncture by radius void 54, as mentioned above. Radius void 54 is formed at the inside corner of the angled junction to help avoid splitting of the unitary body due to tensioning of the elastomeric material during flexure of the blade seal. Base segment 70 is received in a T-shaped slot in vertical frame section 16, as best seen in FIG. 3. Accordingly, flexure means 54 at the angled junction between base segment 70 and lateral segment 66 facilitates bending of the free portion of the blade seal relative the more fixed position base segment.

The base segment extends from the angled junction with the lateral segment 66 in a direction substantially away from the seal segment, that is, away from the sealing plane at which sealing surface 52 will have surface-to-surface interface with exterior surface 40 of pane 34. This permits seal segment 58 to project into the gap or space between vertical frame section 16 and sliding pane 34. The free distal portion 72 of the base segment is configured in accordance with the requirements of the particular application for which the blade seal is intended. In the preferred embodiment illustrated in FIG. 4, distal portion 72 has laterally extending attachment flanges 74, 76, whereby the blade seal is captured in the aforesaid T-shaped slot in vertical frame section 16. In the manufacture of window assembly 10, the base segment 70 at one end of the blade seal can be fed into an open end of the T-shaped slot, following which the blade seal can simply be pulled longitudinally into position along vertical frame section 16. Replacement of the blade seal when worn can be accomplished simply by pulling out the old seal and pulling in a new seal.

Figure 6:
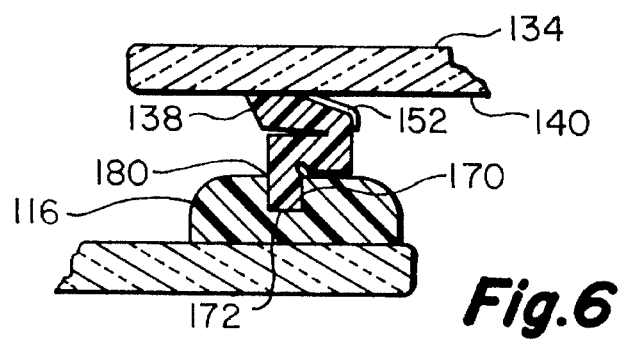
FIG. 6 is a sectional view corresponding to that of FIG. 3, schematically illustrating an alternative preferred embodiment.
Figure 7:
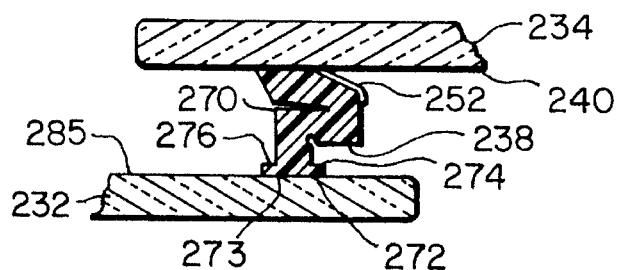
FIG. 7 is a cross-sectional view corresponding to that of FIGS. 3 and 6, schematically illustrating another alternative embodiment.

Alternative embodiments of the blade seal are illustrated in FIGS. 6 and 7. In FIG. 6, base segment 170 is seen to extend to a free distal portion 172 which does not have attachment flanges as in the embodiment of FIG. 4. In the embodiment of FIG. 6, base portion 170 typically would be adhesively secured within U-shaped recess 180 in frame segment 116. In the alternative preferred embodiment of FIG. 7, blade seal 238 is seen to comprise a base portion 270 which extends to a distal portion 272 having laterally extending attachment flanges 274 and 276. Free distal surface 273 of blade seal 238 is adhesively bonded to surface 285 of adjacent glass pane 232. The alternative embodiments of FIGS. 6 and 7 operate substantially as described above. Thus, sealing surface 152 of blade seal 138 in FIG. 6 seals against surface 140 of sliding pane 134. Similarly, sealing surface 252 of blade seal 238 in FIG. 7 seals against surface 240 of sliding pane 234.

In view of the foregoing disclosure, those who are skilled in this area of technology will recognize that various modifications and additions can be made to the preferred embodiments discussed above without departing from the true scope and spirit of the present invention. All such alternative embodiments are intended to be covered by the following claims.

We claim:

1. A flexible blade seal for closure of a gap between a windowpane and an adjacent member of a window assembly, comprising an elongate body of substantially uniform cross section formed of flexible elastomeric material, wherein, in cross section, a seal segment forms an exposed, substantially planar sealing surface for contact in a sealing plane against a surface of the pane, the seal segment in a free state extending at an angle to the sealing plane from a free end to a substantially flat end wall in a plane substantially perpendicular to the sealing plane, a lateral segment extends, at an acute angle to the seal segment, from the end wall to an angled junction with a base segment, and the base segment extends, in a direction substantially away from the sealing plane, from the angled junction with the lateral segment to a free distal portion attachable to the window assembly.

2. The flexible blade seal in accordance with claim 1 wherein the lateral segment extends between the end wall and its angled junction with the base segment in a plane substantially parallel the sealing plane.

3. The flexible blade seal in accordance with claim 1 wherein the elastomeric material consists essentially of EPDM and the blade seal further comprises polyester flocking on the sealing surface.

4. The flexible blade seal in accordance with claim 1 wherein the free distal portion of the base segment comprises an outward extending lateral attachment flange.

5. A flexible blade seal for closure of a gap between a windowpane and an adjacent member of a window assembly, comprising an elongate body of substantially uniform cross section formed of flexible elastomeric material, wherein, in cross section, a seal segment forms an exposed, substantially planar sealing surface for contact in a sealing plane against a surface of the pane, the seal segment in a free state extending at an angle to the sealing plane from a free end to a substantially flat end wall in a plane substantially perpendicular to the sealing plane, a lateral segment extends, at an acute angle to the seal segment, from the end wall to an angled junction with a base segment, and the base segment extends, in a direction substantially away from the sealing plane, from the angled junction with the lateral segment to a free distal portion attachable to the window assembly, wherein a radius void for flexure is provided at the angled junction of the lateral segment to the base segment.

6. A flexible blade seal for a window assembly, comprising an elongate unitary body of substantially uniform cross section formed of flexible elastomeric material and having a cross-sectional configuration wherein:

a seal segment forms an exposed, substantially planar sealing surface which, in its free state, is resiliently biased to intersect a sealing plane, extending from a free end to a substantially flat and smooth end wall substantially perpendicular to the sea ling plane;

a lateral segment substantially parallel the sealing plane extends from the end wall at an inside angle of 25° to 65° to the seal segment, to a substantially right-angled junction with a base segment; and the base segment extends from the right-angled junction with the lateral segment in a direction away from the sealing segment to a free distal portion having attachment flanges extending laterally outward substantially parallel to the sealing plane.

7. A window assembly comprising, in combination, a sliding pane mounted in a substantially vertical plane in a window opening, for horizontal movement between an open position and a closed position, and a vertical blade seal for closure of a gap between the sliding pane and an adjacent member of the window assembly, the vertical blade seal comprising an elongate, vertically mounted, unitary body of substantially uniform cross-section through a horizontal plane, formed of flexible elastomeric material, wherein a seal segment of the unitary body forms an exposed, substantially planar sealing surface resiliently biased towards sliding contact with a surface of the sliding pane in its closed position, the seal segment extending, in horizontal cross-section, from a free end to a substantially flat end wall perpendicular to the surface of the sliding pane and facing toward the window opening, a lateral segment extends from the end wall in a direction generally away from the window opening, at an acute angle to the seal segment, to an angled junction with a base segment, and the base segment extends from the angled junction in a direction generally away from the vertical plane of the sliding pane to a free distal portion attached to the adjacent member of the window assembly.

8. The window assembly of claim 7 wherein the sealing surface of the blade seal is in contact with the surface of the sliding pane only when the sliding pane is substantially in its closed position.

9. The window assembly of claim 7 wherein the adjacent member of the window assembly is a fixed-position pane and the base segment of the blade seal is adhesively attached to a surface of the fixed-position pane.

10. The window assembly of claim 7 wherein the base segment of the blade seal is attached to a vertically extending section of a frame of the window assembly.

11. The window assembly of claim 10 wherein the distal portion of the base segment comprises attachment flanges which extend laterally outward in a plane substantially parallel to the surface of the sliding pane, the base segment being slidingly received in a T-shaped slot in the vertically extending section of the frame.

12. The window assembly of claim 7 further comprising a horizontal blade seal mounted along a horizontal peripheral edge of the window opening, having a sealing surface in sliding contact with the surface of the sliding pane and a substantially flat end surface in surface-to-surface abutting contact with the end wall of the vertical blade seal.

13. A window assembly comprising, in combination:

A) a frame defining a window opening in a substantially vertical plane;

B) a sliding pane mounted to the frame for horizontal movement between a closed position, in which it closes the window opening, and an open position, a peripheral area of an inside surface, proximate a vertical leading edge of the sliding pane, being positioned adjacent a vertical frame section in the closed position;

C) a vertical blade seal comprising an elongate body formed of flexible elastomeric material and having a substantially uniform cross-section through a horizontal plane, mounted vertically along the vertical frame section for sealing contact with the peripheral area of the outside surface of the sliding pane in its closed position, the elongate body of the vertical blade seal comprising a seal segment having a substantially planar sealing surface extending from a free end to a substantially flat end wall which is perpendicular to the outside surface of the sliding pane and faces toward the window opening, the sealing surface, in its free state, being angled diagonally toward the leading edge of the sliding pane and, when the sliding pane is in the closed position, being biased resiliently into sliding contact with the peripheral area of the outside surface; and a lateral segment extending from the end wall in a direction generally away from the window opening, at an acute angle to the seal segment, to a right-angle junction with a base segment, the base segment extending from the right-angle junction in a direction generally away from the vertical plane of the sliding pane to a free distal portion which has attachment flanges extending laterally outward and which is slidingly received in a T-shaped slot extending vertically in the vertical frame section;

D) an upper horizontal blade seal mounted to an upper horizontal frame section, having a sealing surface in sliding contact with an upper horizontal peripheral area of the outside surface of the sliding pane, and having a substantially flat end surface in surface-to-surface abutting contact with the end wall at an upper end of the vertical blade seal; and E) a lower horizontal blade seal mounted to a lower horizontal frame section, having a sealing surface in sliding contact with a lower horizontal peripheral area of the outside surface of the sliding pane, and having a substantially flat end surface in surface-to-surface abutting contact with the end wall at a lower end of the vertical blade seal.

* * * * *